US008374720B2

(12) United States Patent
Kechel

(10) Patent No.: US 8,374,720 B2
(45) Date of Patent: Feb. 12, 2013

(54) METHOD AND APPARATUS FOR SORTING ARTICLES BY WAY OF STORAGE REGIONS

(75) Inventor: Ottmar Kechel, Stockach (DE)

(73) Assignee: Siemens Aktiengesellschaft, Munich (DE)

( * ) Notice: Subject to any disclaimer, the term of this patent is extended or adjusted under 35 U.S.C. 154(b) by 411 days.

(21) Appl. No.: 12/823,501

(22) Filed: Jun. 25, 2010

(65) Prior Publication Data

US 2010/0332020 A1 Dec. 30, 2010

(30) Foreign Application Priority Data

Jun. 26, 2009 (DE) ......................... 10 2009 030 745

(51) Int. Cl.
*B07C 5/00* (2006.01)
*G06K 9/00* (2006.01)
*G06F 7/00* (2006.01)

(52) U.S. Cl. ........ 700/224; 700/223; 700/225; 700/226; 700/228; 209/630; 209/542; 209/584; 209/583; 209/552; 209/547

(58) Field of Classification Search ........................ None
See application file for complete search history.

(56) References Cited

U.S. PATENT DOCUMENTS

| | | | |
|---|---|---|---|
| 5,097,979 | A | 3/1992 | McDermott et al. |
| 5,158,183 | A | 10/1992 | Beerman et al. |
| 5,433,325 | A | 7/1995 | Levaro et al. |
| 5,577,596 | A | 11/1996 | Van Essen |
| 5,799,800 | A | 9/1998 | Lux |
| 5,958,288 | A | 9/1999 | Mueller et al. |
| 6,366,828 | B1 | 4/2002 | De Leo et al. |

(Continued)

FOREIGN PATENT DOCUMENTS

| | | | |
|---|---|---|---|
| DE | 10 2004 056 696 | B4 | 8/2006 |
| EP | 0 429 118 | B1 | 5/1996 |

(Continued)

OTHER PUBLICATIONS

German Patent and Trademark Office Search Report, dated Mar. 23, 2010.

*Primary Examiner* — Gene Crawford
*Assistant Examiner* — Yolanda Jones
(74) *Attorney, Agent, or Firm* — Laurence A. Greenberg; Werner H. Stemer; Ralph E. Locher

(57) ABSTRACT

An apparatus and a method for sorting articles, in particular flat mail items. The sorting plant has a feed transport path, a lead-away transport path, a plurality of connecting transport paths, a plurality of storage regions, and a sorting plan. Each connecting transport path branches off from the feed transport path and issues into the lead-away transport path. The feed transport path or the lead-away transport path is configured as a storage transport path which contains the storage regions, in the form of a sequence of successive storage regions. The sorting plan assigns a storage region, to each possible feature value of a sorting feature. The sorting plant selects a storage region for each article, using the sorting plan and as a function of the measured feature value. When the sorting plant has selected for a first article a first storage region and for a following second article a second storage region which comes after the first storage region in the sequence, the sorting plant temporarily stores the first article in the first storage region and transports the second article, using the overtaking transport path, past the first article stored in the first storage region to the second storage region.

21 Claims, 9 Drawing Sheets

U.S. PATENT DOCUMENTS

| | | | | |
|---|---|---|---|---|
| 6,978,192 | B2 | 12/2005 | Wisniewski | |
| 7,201,277 | B2 | 4/2007 | Wilke | |
| 7,397,010 | B2 | 7/2008 | Wilke | |
| 7,405,375 | B2 | 7/2008 | Hanson | |
| 7,547,147 | B2 * | 6/2009 | Niebling et al. | 384/544 |
| 7,547,174 | B1 | 6/2009 | Pippin et al. | |
| 7,683,284 | B2 | 3/2010 | Haselberger et al. | |
| 2008/0011653 | A1 | 1/2008 | Stemmle | |
| 2008/0087582 | A1 * | 4/2008 | Zimmermann | 209/552 |
| 2009/0218261 | A1 * | 9/2009 | Berdelle-Hilge | 209/584 |

FOREIGN PATENT DOCUMENTS

| | | | |
|---|---|---|---|
| EP | 0 723 483 | B1 | 7/1996 |
| EP | 0 923 997 | A2 | 6/1999 |
| EP | 1 663 525 | B1 | 6/2006 |
| EP | 1 872 868 | A1 | 1/2008 |
| EP | 1 878 511 | A1 | 1/2008 |

* cited by examiner

METHOD AND APPARATUS FOR SORTING ARTICLES BY WAY OF STORAGE REGIONS

CROSS-REFERENCE TO RELATED APPLICATION

This application claims the priority, under 35 U.S.C. §119, of German patent application DE 10 2009 030 745.1, filed Jun. 26, 2009; the prior application is herewith incorporated by reference in its entirety.

BACKGROUND OF THE INVENTION

Field of the Invention

The invention relates to an apparatus and a method for the sorting of articles, in particular of flat mail items.

A generic apparatus, in the form of a sorting plant, is described in U.S. Pat. No. 6,978,192 B2. There, there is described a sorting plant for the sorting of a plurality of articles with:

a measuring device, a feed transport path, a lead-away transport path, a plurality of connecting transport paths, a plurality of storage regions, and a data store with a computer-evaluatable sorting plan, the feed transport path, each connecting transport path and the lead-away transport path being configured for transporting articles in each case in a transport direction, each connecting transport path branching off from the feed transport path and issuing into the lead-away transport path, the sorting plan assigning a storage region, in each case to each possible feature value of a stipulated sorting feature, the measuring device being configured for measuring, for each article to be sorted, which feature value the sorting feature assumes for this article.

The sorting plant is configured:

for each article to be sorted, using the sorting plan and as a function of the measured feature value, for selecting a storage region, for transporting each article at least once on the feed transport path, on a connecting transport path and on the lead-away transport path and for temporarily storing it in the selected storage region, so that, after transport, the articles are sorted as a function of their feature values in the lead-away transport path.

In other words, U.S. Pat. No. 6,978,192 B2 describes a sorting plant which sorts mail items in a single sorting run ("single path"). The sorting plant of FIG. 1 includes a plurality of feed devices ("feeders 102") with readers ("OCR/barcode readers 107"). Each mail item is fed to the sorting plant via a feed device 102, passes a reader 107 and is transported into a feed transport path ("outer transport system 104"). A plurality of connecting transport paths ("injection stations 106") branch off from this feed transport path 104 to form a ring transport path ("inner transport system 108"). The ring transport path 108 leads to a buffer store ("buffer 114"). The ring transport path 108 and the buffer store 114 together form a closed transport path. A sequence among the possible delivery points ("delivery points DP1, DP2, DP3") is stipulated. In the ring transport path 108, an order among the mail items is generated under delivery addresses according to this sequence. For this purpose, each mail item in the feed transport path 104 is drawn forward as far as a connecting transport path 106 and is then transported into the ring transport path 108 by means of this connecting transport path 106. It is possible that insufficient space is available in the ring transport path 108 for a mail item to be correctly introduced. In this case, the mail items upstream of the mail item to be introduced are transported as far as a buffer store 114. This buffer store 114 feeds the mail items into the ring transport path 108 again, so that a sufficiently large gap occurs.

U.S. Pat. No. 5,577,596 describes a sorting plant for mail items or the like. This sorting plant has four "input stations 1a, 1b, 1c, 1d" and a large number of "output positions 3a, 3b", cf. FIG. 1. A connecting system connects the "input stations" to the "output position" so that a mail item can be transported from each "input station" to each "output position". A feed transport path emanates in each case from each "input station". A lead-away transport path leads in each case to each "output position". A plurality of connecting transport paths connect each feed transport path to each lead-away transport path. These transport paths are implemented by a multiplicity of "separate transport units 23". Each "transport unit 23" possesses a "disk-shaped support 25" and a "transport mechanism 27". Each "transport unit 23" can be rotated so that different transport paths can be implemented by means of differently positioned "transport units 23". In the embodiment of FIG. 1, the connecting system comprises five parallel "tracks 103a, 103e", each with a large number of "transport units 23". In the arrangement of FIG. 6, four "input positions 147a to 147d" are arranged in the middle of a sorting plant and form a rectangle, and "transport units 23" are arranged in a hexagonal grid between these four "input positions 147a to 147d". Located on the left and right outside this grid are two "wing portions 157, 159", each with two rows of "output positions 165a to 165d". The connecting system consists of the grid with the "transport units" and in each case with two parallel "tracks 161, 63" to the two "wing portions 157, 159". FIG. 7 shows an alternative to the "transport unit 23", to be precise a "transport unit 167" with a "transport mechanism 169" which consists of two endless conveyor belts. The "transport unit 167" can be displaced out of two "straight guides 173, 175" perpendicularly with respect to the transport direction of the endless conveyor belts. FIG. 8 shows an arrangement with two parallel "tracks 183a, 183b", between which a free "travel track" is located. In this "travel track", a "track unit 167" can be displaced out of the "track 183a" or "183b", a "track unit 167b" taking along a mail item 185 from the "track 183a" and transferring it to a "transport unit 167g". This "transport unit 167g" takes along the mail item 185 into the other "track 183b".

German published patent application DE 10 2004 056 696 A1 describes a sorting plant for mail items with three inputs E1, E2, E3 and three outputs A1, A2, A3. Three parallel transport paths in each case connect an input to an output. Between these three transport paths, a plurality of connecting paths are present, which branch off in each case from a switch W1, W2, . . . and which issue into a convergence point Z11, . . . , Z21, . . . , KZ1, . . . , KZ4. Some convergence points are designed as crossings. Each input can thereby be connected to each output via at least two paths. As a result, a mail item can be transported through between a stream of mail items on a crossing. A sufficiently large gap is provided, as required.

European published patent application EP 1872868 A1 describes an arrangement with three sorting devices 1a, 1b, 1c for the sorting of mail items. Each sorting device possesses a feed device 2a, 2b, 2c, a transport device 5a, 5b, 5c, a reader 6a, 6b, 6c and a sorting portion 7a, 7b, 7c, in each case with a multiplicity of distribution devices 8a, 8b, 8c. Each sorting device 1a, 1b, 1c has in each case a discharge device 9ab, 9ac, 9ba, . . . for every other sorting device, that is to say, in the example of FIG. 1, a total of 3×6 discharge devices. The mail items which one sorting device 1a discharges for another sorting device 1b are brought into a container 10 in the discharge device 9ab. The filled container 10 is transported by means of a transport system 11 to an introduction apparatus 12a, 12b, 12c in the correct sorting device. The correct sorting device has a further reading device 13a, 13b, 13c for the mail items thus introduced.

European published patent application EP 1878511 A1 describes a sorting plant with at least one “batch sorting module”. A feed transport device transports unsorted mail items to the “batch sorting module”. A sequence of branch-off points is located in the feed transport device. Each branch-off point leads to a store (“temporary batch storage 112”). Each store issues into a lead-away transport section. In each store, stacks of mail items are formed, and the stacks are successively brought into the lead-away transport device and transported away by this. Two such sorting modules can be connected in series in a cascade-like manner, in order to bring about sorting in two sorting runs. During transport, each mail item is held by a clamp (“clamp”).

European patent EP 0429118 B1 describes a sorting plant for flat articles, in particular for mail items. A feed transport path (“main feed track 1”) transports the mail items to a storage system having a multiplicity of stores (“buffers 20”). A sequence of branch-off points is arranged along the feed transport path. The stores are arranged, for example, in three parallel paths, each with four series-connected stores. A sequence of issuing points is arranged along a lead-away transport path. The unsorted mail items are distributed to the stores and are transported away, sorted, by the lead-away transport path.

U.S. Pat. No. 7,405,375 B2 describes a sorting plant with two transport devices. The articles, for example mail items, to be sorted are held by holding elements, for example clamps. Each transport device can transport these holding elements, specifically in each case along a closed transport track. Each holding element is first transported by the first transport device (“first carriage 112a”), then brought into the second transport device (“second carriage 112b”) and transported further on by this.

During continuous operation, the respective delivery address of each mail item is read. The mail item is brought into a holding element. A sorting code is assigned, on the one hand, to each loaded holding element and, on the other hand, also to each free space in the second transport device. The holding elements are brought into the previously free spaces according to these sorting codes. An order among the articles is thereby effected. An order among loaded holding elements in the second transport device is effected in this way.

European patent EP 0723483 B1 describes a method and an apparatus for sorting articles by means of a plurality of collecting zones. The articles, for example garments on clothes hangers, are first brought into a collecting zone having a plurality of build-up lines and are distributed from there to following collecting zones.

U.S. Pat. No. 5,097,979 describes a sorting plant with a separator, with a transport path and with a plurality of storage regions. A switch is provided in each case in the transport path for each storage region. The separator draws off flat articles (“documents”) from a stack. The transport path transports a stream of flat articles. Each switch deflects flat articles into the assigned storage region. As a result, in each storage region, a stack of flat articles is formed in each case.

SUMMARY OF THE INVENTION

It is accordingly an object of the invention to provide a method and a device for sorting objects by way of storage regions which overcome the above-mentioned disadvantages of the heretofore-known devices and methods of this general type and which provides for an apparatus and a method which avoid the need for providing storage regions in the connecting transport paths.

With the foregoing and other objects in view there is provided, in accordance with the invention, a sorting plant for the sorting of a plurality of articles, the sorting plant comprising:

a feed transport path;

a lead-away transport path;

a plurality of connecting transport paths each branching off from said feed transport path and issuing into said lead-away transport path;

a plurality of storage regions, each configured for temporarily storing a plurality of articles to be sorted; and a data storage device with a computer-evaluatable sorting plan;

said feed transport path, each said connecting transport path, and said lead-away transport path being configured for transporting the articles in a given transport direction;

said sorting plan assigning a storage region, in each case to each possible feature value of a stipulated sorting feature;

a measuring device configured for measuring, for each article to be sorted, which feature value the sorting feature assumes for the respective article;

wherein one of said feed transport path or said lead-away transport path is configured as a storage transport path and the other of said feed transport path and lead-away transport path is configured as an overtaking transport path;

wherein said storage transport path comprises said storage regions, in the form of a sequence of successive storage regions, and wherein the sorting plant is configured:

for each article to be sorted, to use the sorting plan and, as a function of the measured feature value, to select a storage region;

to transport each article at least once on said feed transport path, on a respective said connecting transport path, and on said lead-away transport path, and to temporarily store the article in the selected said storage region;

when the sorting plant has selected a first storage region for a first article and a second storage region for a following, second article, wherein the second storage region, as seen in the transport direction of the storage transport path, comes after the first storage region in the sequence:

to temporarily store the first article in the first storage region;

to transport the second article, using the overtaking transport path, past the first article stored in the first storage region to the second storage region;

so that, after transport, the articles are sorted as a function of the respective feature values thereof in said lead-away transport path.

A sorting feature according to which the articles are to be sorted and a breakdown of the value range of this sorting feature into possible feature values are stipulated.

The sorting plant in accordance with the invention includes the following components:

a measuring device, a feed transport path, a lead-away transport path, a plurality of connecting transport paths, a plurality of storage regions, and a data store with a computer-available sorting plan.

The feed transport path is configured for transporting articles to be sorted in a transport direction. Each connecting transport path is configured for transporting articles to be sorted in a transport direction. The lead-away transport path is configured for transporting articles to be sorted into a transport direction.

Each connecting transport path branches off from the feed transport path and issues into the lead-away transport path.

The feed transport path or the lead-away transport path is configured as a storage transport path. The other of these two transport paths is configured as an overtaking transport path.

The storage transport path comprises the storage regions in the form of a sequence of successive storage regions. This sequence of storage regions forms a component of the storage transport path. Each storage region is configured for temporarily receiving in each case a plurality of articles to be sorted.

The sorting plan assigns a storage region of the storage transport path of the sorting plant in each case to each possible feature value of the sorting feature.

The measuring device is configured for measuring, for each article to be sorted, which feature value the stipulated sorting feature assumes for this article.

The sorting plant is configured, for each article, using the sorting plan and as a function of the measured feature value, for selecting that storage region which the sorting plan assigns to the measured feature value and, consequently, an issuing point, for transporting each article at least once on the feed transport path, in each case on a connecting transport path and on the lead-away transport path and for temporarily storing it in the selected storage region, so that the articles are sorted as a function of their feature values in the lead-away transport path, when the sorting plant has selected for a first article a first storage region and for a following second article a second storage region which, as seen in the transport direction (T) of the storage transport path, comes after the first storage region in the sequence, for temporarily storing the first article in the first storage region and for transporting the second article, using the overtaking transport path, past the first article stored in the first storage region to the second storage region.

According to the solution, the articles are stored in one of the two transport paths, that is to say either in the feed transport path or in the lead-away transport path. The other transport path is configured as an overtaking transport path and remains free of stored articles. The articles are therefore not necessarily stored in an intermediate store which is located in a connecting transport path. As a result, connecting transport paths can be implemented which are free of intermediate stores and, during the entire sorting, are available unrestrictedly for the transport of articles.

The apparatus can be configured so that each connecting transport path remains free of intermediately stored articles. Consequently, during the entire sorting, each connecting transport path is available for the transportation of articles, without this connecting transport being blocked by intermediately stored articles.

If the lead-away transport path is configured as a storage transport path, the storage regions are arranged in the lead-away transport path and the feed transport path functions as an overtaking path. If the feed transport path is configured as a storage transport path, the storage regions are arranged in the feed transport path and the lead-away transport path functions as an overtaking path.

The invention avoids the need for separate storage modules in the connecting transport paths, thus saving space. Since the connecting transport paths do not need to have any storage modules, each connecting transport path is available for transporting an article from the feed transport path into the lead-away transport path.

The sorting plant according to the solution requires only a few discharge points at the end of the lead-away transport path, whereas other sorting plants require a multiplicity of sorting output points.

The invention provides a sorting plant which can automatically take into account the possibility that a storage region is filled during continuous operation and no further article can be intermediately stored in this storage region. It is not necessary to provide a fixed overflow storage region and to store an article in this fixed overflow storage region.

Furthermore, it is not necessary to transport all the articles in the storage transport path to a gap generation device ("gap correction module") which produces a gap in a sequence of articles. Such transport takes up time and necessarily exerts a mechanical load upon the articles to be sorted.

Instead, the invention makes it possible to provide a reserve storage region with a variable position in the storage transport path. This reserve storage region is preferably configured in exactly the same way as the other storage regions. A storage region is preferably converted during continuous operation from a reserve storage region into another storage region. This variable position makes it possible that the sorting plant according to the solution operates with a high throughput even when it is not known beforehand how many articles have in each case which feature value. A fixed overflow storage region within the sequence of storage regions may be located at a point in the sequence which proves to be unfavorable during sorting. A fixed overflow storage region outside the sequence of storage regions results in the articles in the overflow storage region not being sorted.

The storage transport path can preferably draw the intermediately stored articles forward into such a reserve storage region when the storage space in a storage region proves to be insufficiently large during sorting. This makes it possible to maintain a stipulated sequence among the articles in the lead-away transport path, without it having to be known beforehand how many articles have in each case which feature value. By virtue of the invention, the storage transport path with its storage regions is available for intermediate storage. This configuration makes it possible, during continuous operation, to provide a coherent storage region for a quantity of feature values in that the original storage region is supplemented by a reserve storage region. This configuration avoids the situation where the enlarged storage region is divided into a plurality of parts by other storage regions of the sequence, and ensures that the order among the articles to be sorted is effected or an already effected order is maintained.

If, by contrast, articles were stored intermediately in a storage module located in a connecting transport path, these articles can be displaced, during intermediate storage, only within the connecting transport path with its restricted length and storage capacity.

Furthermore, the invention avoids the need for overflow compartments which will otherwise have to be kept available for the situation where individual feature values of an especially large number of articles are assumed.

Preferably, the storage transport path comprises at least one reserve storage region. The sorting plan is changed during sorting, when it becomes clear that, in the storage transport path, there is not sufficient space in a storage region to receive all the articles, to the feature values of which this storage region is assigned. The sorting plan is changed so that the changed sorting plan assigns to each feature value, to which the original sorting plan assigns a storage region which lies upstream of the reserve storage region in the sequence, in each case that storage region which follows downstream of the previously assigned storage region by the amount of one position in the sequence.

In one refinement, at least one reserve storage region is located between two other storage regions. This refinement makes it possible to draw articles forward to the reserve storage region more quickly than when the reserve storage region is located at the end of the sequence of storage regions. Instead, a reserve storage region at the end is available as a reserve for any other storage region in the storage transport path.

In another refinement, at least one reserve storage region is located, as seen in the transport direction, downstream of all the storage regions to which the sorting plan assigns feature values. This reserve storage region can then be used, irrespective of which storage region is filled. It is possible that the sorting plant possesses a reserve storage region downstream of the storage regions and a further reserve storage region in a variable position.

Preferably, the sorting plant is configured so that each article runs at least twice through the feed transport path, in each case a connecting transport path and the lead-away transport path, that is to say two sorting runs are carried out for each article. After the first sorting run, each article is located in the lead-away transport path, and the articles are sorted according to the sorting plan in the lead-away transport path. After the first sorting run, each article is transported from the lead-away transport path to the feed transport path again, specifically, preferably, by means of at least one return transport path which leads from the lead-away transport path to the feed transport path and transports articles. In the second sorting run, once again, a sorting plan is used which in each case assigns a sorting region to each possible feature value. The sorting plan used in the second sorting run differs from the sorting plan used in the first sorting run. After the second sorting run, once again, an order among the articles is effected.

If N1 storage regions are used in the first sorting run and N2 storage regions are used in the second sorting run, it is possible, by means of the sorting plant according to the solution, to sort to a maximum of N1×N2 feature values. More specifically, articles with a maximum of N1×N2 different feature values can be brought into a sequence according to a stipulated order among the possible feature values. The number of storage regions of the sorting plant may therefore be markedly smaller than the number of possible feature values. This is important, for example, when each possible feature value is a possible destination address of a mail item and the mail items are to be sorted according to their destination addresses into a delivery round sequence of a mail person ("delivery sequence").

Before the first sorting run, the articles can be fed in any desired order to the feed transport path. It is not necessary to sort the articles before the first sorting run.

In a preferred refinement, the articles are returned to the feed transport path via at least one return transport path. This refinement avoids the need for the step of discharging each article from the sorting plant after the first sorting run and of feeding it to the sorting plant again for the second sorting run.

Preferably, the sorting device comprises at least two infeed devices operating in parallel and an additional feed transport path. The additional feed transport path leads from a second infeed point to the feed transport path and issues into the feed transport path between two branch-off points. At each of these branch-off points, in each case a connecting transport path branches off from the feed transport path. The articles to be sorted are fed into the sorting plant by means of the infeed devices. Since two infeed devices are used, the throughput rises. Those articles which are fed in via the second infeed device are sorted by means of those storage regions which lie downstream of the two branch-off points. The other storage regions are available solely for those articles which have been fed in by means of the first infeed device. This leads to more rapid sorting especially when the sorting plan assigns storage regions lying predominantly or solely downstream to the feature values of the articles which have been fed in via the infeed device. Via the second infeed device, for example, articles already selected beforehand are fed in.

It is possible to transport flat articles upright in each case between two endless conveyor belts ("pinch-belt system"). Preferably, by contrast, during the entire sorting each article is held by a holding apparatus ("escort"), for example by a storage pocket or an arrangement with at least one clamp. This refinement avoids the need for the step of pushing together ("shingling" or "stacking") articles to be sorted and of drawing them apart again. Such pushing together is carried out in many sorting plants so that the transported articles require less space, in order thereby to save space for the sorting plant. Such a procedure is described, for example, in U.S. Pat. No. 6,366,828 and in European patent application EP 923997 A2. During the separation or drawing apart which is required later, faults may occur, in particular double draw-offs.

In one refinement, each holding apparatus transports a flat article so that the transported flat article stands vertically. In this refinement, less floor area ("footprint") is occupied than in other refinements. In one refinement, each holding apparatus is positioned so that the article plane of the article is approximately perpendicular to the respective transport direction during the entire transport. This refinement saves required transport distance.

In another refinement, the holding apparatus is positioned so that the article is arranged perpendicularly to the transport direction when the article is transported along a connecting transport path. During transport along another transport path (feed, lead-away or return transport path), by contrast, the holding apparatus is oriented so that the article is approximately parallel or oblique to the transport direction. This refinement makes it possible for any other transport path to have a narrow configuration, that is to say with a small extent perpendicular to the transport direction, irrespective of the width of an article to be transported. In the other transport path, a high transport speed can be implemented, thus compensating the increased transport distance.

Preferably, during the entire sorting, each article remains in or on the holding apparatus, even when the sorting plant carries out a plurality of sorting runs. This refinement avoids the need for loading and unloading operations.

In one refinement, after the first sorting run, each article is transported to the feed transport path in such a way that the article reaches the feed transport path at an issuing point, this issuing point lying between two branch-off points, from each of which a connecting transport path branches off. This refinement makes it possible, in the second sorting run, to use only some of the storage regions and to use the other storage regions for other sorting tasks, for example for the sorting of following articles.

Other features which are considered as characteristic for the invention are set forth in the appended claims.

Although the invention is illustrated and described herein as embodied in a method and apparatus for the sorting of articles by means of storage regions, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
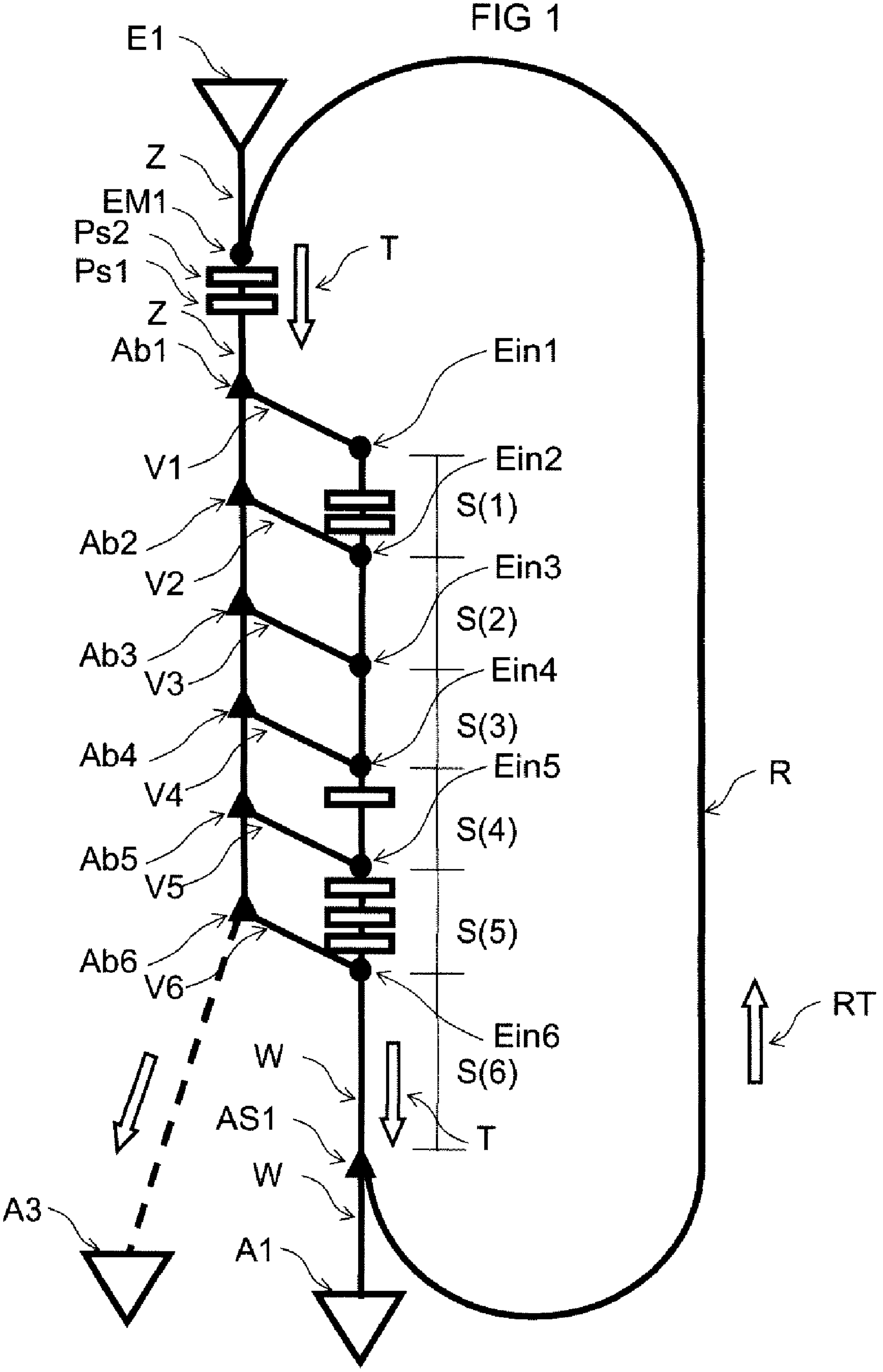
FIG. 1 shows an exemplary sorting plant with six sorting regions in the lead-away transport path.

Referring now to the figures of the drawing in detail, the apparatus of the exemplary embodiment is used for sorting flat mail items (standard letters, large letters, postcards, catalogs, etc.). Each mail item is provided with particulars of a delivery address to which this mail item is to be transported. Either the delivery address is printed in a human-readable form onto the mail item, or the mail item is provided with an unambiguous machine-readable identification. The term "mail item" refers to any of a large variety of shipping consignments that are addressed to a recipient.

Each mail item runs through the following route from the sender to the recipient:

The mail item is thrown into a letterbox or driven to a mailing agency or parcel compartment plant.

The mail item is transported from there to a sorting plant. This sorting plant is competent for the delivery location.

This sorting plant reads the delivery address to which the mail item is to be transported and determines which sorting plant is competent for the read delivery address.

It is possible that the same sorting plant is competent both for the delivery location and for the destination location. In this case, the mail item runs through the same sorting plant twice.

If another sorting plant is competent for the read delivery address, the mail item is transported to this other sorting plant.

That sorting plant which is competent for the delivery address carries out sorting by delivery round sequence. In this case, mail items are sorted exactly according to the delivery round sequence ("delivery sequence") of a mail person.

A mail person (i.e., a delivery person such as a delivery driver or a mail carrier) transports the mail item to the recipient.

The sorting plant has reading access to an address database with all the valid addresses of a delivery zone, for example of a country. Furthermore, the sorting plant has reading access to a data store having a computer-available sorting plan.

The sorting plant comprises a reader with a camera and with an evaluation unit. The camera in each case generates at least one image of each mail item, this image showing the delivery address particulars of the mail item. The evaluation unit evaluates the image, deciphers the delivery address particulars by "optical character recognition" (OCR) and thereby determines the delivery address. In this case, the evaluation unit looks for valid delivery addresses in the address database. If the evaluation unit does not succeed, within a stipulated time span, in automatically identifying the delivery address unequivocally with sufficient reliability, the image is displayed on a monitor of a video coding station, and a worker manually inputs at least part of the delivery address, for example the postal code or ZIP code.

The sorting plant includes, furthermore, a data-processing control unit.

Referring now to FIG. 1 in detail, there is shown an embodiment of the sorting plant according to the invention. In this embodiment, the sorting plant comprises the following components:

an infeed point E1, a discharge point A1, a feed transport path Z with a sequence of branch-off points Ab1, Ab2, . . . , in the example shown six branch-off points Ab1, Ab2, . . . , Ab6, a lead-away transport path W with a sequence of issuing points Ein1, Ein2, . . . , in the example shown six issuing points Ein1, Ein2, . . . , Ein6, a sequence of connecting transport paths V1, V2, . . . between the feed transport path Z and the lead-away transport path W, in the example shown six connecting transport paths V1, V2, . . . , V6, each connecting transport path V1, V2, . . . leading from a branch-off point to an issuing point, a return transport path R.

FIG. 1 illustrates branching points by means of black upright triangles, the in each case feeding transport path issuing from above into the apex of such a triangle. Issuing points are illustrated by black circles. Infeed points and discharge points are illustrated by black-edged triangles.

Each infeed point E1, . . . comprises a feed device ("feeder") with a separator ("singulator"). It is possible to provide a plurality of infeed points for different types of mail items or to connect a plurality of identical infeed points in parallel, in order to increase the feed rate of mail items. In the exemplary embodiment, in each case a stream of upright mail items spaced apart from one another leaves each infeed point E1, . . . .

In one refinement, the mail items to be sorted are transported and sorted in each case in a holding component ("escort"), this being described in more detail further below. At each infeed point E1, . . . , the previously separated mail items are brought in each case into a holding component and temporarily connected to this holding component.

Each discharge point A1, A2, . . . preferably comprises a station which fills containers with sorted mail items and which identifies the containers by a destination point to which the container is to be transported. The mail items are stacked, for example, in a container which has been placed onto a supporting surface. Mail items having different feature values (for example, delivery addresses) can be brought into the same container and, in one refinement, are then separated by means of separating elements, for example separating cards. The sorting plant of the exemplary embodiment requires only a few discharge points, whereas other sorting plants require a multiplicity of sorting output points.

In the refinement with the holding components, at least one discharge point A1, A2, . . . the step of extracting the mail items from the holding components again is carried out. It is also possible, however, that mail items in holding components are extracted from the sorting plant at a discharge point A1, A2, . . . and are transported in the holding components, for example, to another sorting plant.

In order to increase the throughput, preferably a plurality of discharge points A1, A2, . . . operating in parallel are used. In one refinement, in each case a discharge point is provided for each storage region S(1), S(2), . . . . In each case a transport path leads from the storage region S(1), S(2), . . . to the discharge point. As soon as a sorting run is terminated, mail items are transported out of a storage region S(1), S(2), . . . via the assigned transport path to the assigned discharge point.

The feed transport path Z is configured for transporting mail items in a transport direction T. The lead-away transport path W is likewise configured for transporting mail items in the transport direction T. It is not necessary, and is often not even possible, for a transport path to transport mail items opposite to the transport direction T. Each connecting path V1, V2, . . . , too, is configured for transporting mail items, specifically from a branch-off point to an issuing point. In the exemplary embodiment, no connecting transport path V1, V2, . . . possesses a store for mail items. Instead, each connecting transport path V1, V2, . . . is configured solely for the transport of mail items in each case from a branch-off point Ab1, Ab2, . . . to an issuing point Ein1, Ein2, . . . . Each transport path therefore functions as a transport device which transports the articles to be sorted along a transport track.

In one refinement, the feed transport path Z terminates at the branch-off point located furthest downstream (in FIG. 1: Ab6). In another refinement, the feed transport path Z leads further on to a feed discharge point A3. A mail item is transported to this feed discharge point A3 when its delivery address cannot be recognized with sufficient reliability in the available time span or when the sorting plan does not assign any storage region to its delivery address.

The return transport path R branches off from the lead-away transport path W at the branch-off point AS1 and issues into the feed transport path Z at the issuing point EM1. The branch-off point AS1 lies downstream of the issuing points Ein1, Ein2, . . . , and the issuing point EM1 lies upstream of the branch-off points Ab1, Ab2, . . . .

In one refinement, mail items are transported upright in each case between two opposite endless conveyor belts ("pinch belts"). These endless conveyor belts are guided around two rollers and clamp the mail item temporarily between them. The rollers are mounted on vertical shafts. The shafts and consequently the rollers rotate at the same speed.

In a preferred refinement, the sorting plant has a multiplicity of holding components ("escort"). Each holding component can hold a mail item while the mail item is being transported through the sorting plant. Preferably, the mail item is temporarily connected to a previously free holding component at the introduction point E1 and remains connected to this holding component until the holding component having the mail item reaches a discharge point AS1, AS2, AS3. A suitable transport device transports the holding component through the sorting plant. A sorting plant with holding components is described, for example, in U.S. Pat. Nos. 7,547,174 B1, 7,397,010 B2, 7,683,284 B2, and patent application publication US 2009/0218261 A1.

Preferably, a machine-readable identification, for example a bar pattern, is applied to each holding component. This identification distinguishes the holding component from all other holding components of the sorting plant. The information as to which mail item is connected to which holding component is stored in a data store. By the identification of the holding component being read, it can be established where a mail item is located.

In one embodiment, the holding components are in the form of storage pockets. Each storage pocket possesses a feed port, through which a mail item can be brought into the storage pocket, and an extraction port, through which the mail item can be extracted from the storage pocket. Preferably, the feed port points vertically or obliquely upward, so that the mail item can be brought into the storage pocket as a result of gravity, or points to the side, so that the mail item can be pushed laterally into the storage pocket. The extraction port is preferably located on the bottom of the storage pocket and is closed by means of a flap. A lever on the flap can open the flap counter to the force of a spring, so that a mail item slides downward out of the storage pocket. It is possible that the feed port functions at the same time as an extraction port. Storage pockets of this type are described, for example, in European patents Nos. EP 0429118 B1 and in EP 1663525 B1.

In another embodiment, the holding components are in the form of clamps. Each clamp grips a mail item from above and holds it during sorting, specifically, preferably, at least two holding points. The transport device comprises, for example, a chain which is drawn and which pulls the holding components along with it, the holding components running, for example, in a rail. A transport device having clamps of this type is described, for example, in European published patent application EP 1878511 A1.

The use of holding components instead of conveyor belts makes it possible for the transport paths to be markedly shorter than in the case of conveyor belts. The mail items are preferably transported so that the mail items are held perpendicularly to the transport direction, whereas, during transport by means of conveyor belts, they are moved parallel to the transport direction T.

In the example of FIG. 1, the lead-away transport path W is designed as a storage transport path. Six storage regions S(1), S(2), . . . , S(6) are formed in the lead-away transport path W. The first five storage regions S(1), . . . S(5) lie between the issuing points Ein1 to Ein6, and the last storage region S(6) lies downstream of the last issuing point Ein6. The last storage region S(6) extends from the last issuing point Ein6 as far as the branch-off point AS1.

A filling-level sensor is mounted in each case, per storage region, in the lead-away transport path W. This filling-level sensor measures the thickness, as seen in the transport direction T, of the stack of mail items which is currently intermediately stored in this storage region. This stack grows in a stacking direction which is opposite to the transport direction of the lead-away transport path W. In the simplest instance, the filling-level sensor detects automatically that the stack reaches a specific point of the storage transport path while the stack is growing upstream. This point is, for example, at a stipulated distance from the next issuing point located upstream. The filling-level sensor comprises, for example, a light barrier. The light barrier is briefly interrupted by a mail item transported past. If the period of time for which the light barrier is interrupted is longer than a stipulated barrier, the light barrier is interrupted by the rearwardly growing stack in the stacking region. In this case, the stipulated filling level is reached. It is also possible that the thickness of the stack is measured, for example in that an image of the stack is generated and is evaluated automatically. It is also possible to count the number of mail items currently located in the stacking region and to determine the thickness of this stack as a product of the number and of a standard thickness. If the mail items are transported in holding components ("escorts"), the thickness of a holding component and the spacing between two adjacent holding components must be taken into account.

The control unit determines the respective current position of each mail item. As a result, the control unit "knows" which mail item is located where and at what time.

The transport speed at which a transport path transports a mail item is controlled and/or measured. If the sorting plant uses holding components with identifications, scanners read these identifications at suitable points, in particular upstream of the first branch-off point Ab1 and downstream of the last issuing point Ein6. If the sorting plant transports mail items by means of endless conveyor belts or if the holding components have no identifications, light barriers measure the respective position of each mail item.

As stated above, the reader determines the respective delivery address of each mail item. A data record is filed in each case for each mail item in a mail item data store and comprises an internal identification of the mail item and a flag of the delivery address determined. The control unit has reading access to this mail item data store and determines the delivery address of a mail item.

The control unit has reading access and also writing access to the data store having the computer-available sorting plan. In the sorting plan, each possible delivery address of a mail item is assigned in each case a storage region S(1), S(2), . . . . The same storage region may be assigned to various possible delivery addresses.

In the exemplary embodiment, each storage region S(i) (i=1, 2, . . . ) in the storage transport path is arranged downstream of an issuing point Ein(i), specifically so that this issuing point Ein(i) issues into the issuing point upstream of this storage region S(i), and the next issuing point Ein(i+1) already issues downstream of this storage region S(i). As a result, the assignment of the sorting plan has the effect that each possible delivery address is assigned an issuing point. Since each connecting transport path connects exactly one branch-off point to an issuing point, the assignment of the sorting plan has the effect that each possible delivery address is assigned a branch-off point. The sorting plan can therefore just as easily assign an issuing point or a branch-off point to a possible delivery address.

In the example of FIG. 1, the sorting plan assigns in each case one of the storage regions S(1), S(2), . . . , S(5) and therefore an issuing point Ein1, Ein2, . . . , Ein5 to various possible delivery addresses. The storage region S(6) and therefore the issuing point Ein6 are temporarily not assigned any possible delivery address.

This storage region S(6) is used as a reserve storage region and is therefore not used at the commencement of sorting. In a general case, the storage transport path has at least one, preferably a plurality of reserve storage regions. These reserve storage regions may all be arranged downstream of the other storage regions. It is also possible to arrange some reserve storage regions between other storage regions. The sorting plan does not assign any possible delivery address to such a reserve storage region.

In the example of FIG. 1, two mail items are intermediately stored in the storage region S(1), one mail item in the storage region S(4) and three mail items in the storage region S(5). The other storage regions are empty. A preceding mail item Ps1 and a following mail item Ps2 are transported by the feed transport path Z toward the first branch-off point Ab1.

The control unit determines the delivery address of the preceding mail item Ps1 and the delivery address of the following mail item Ps2. By the sorting plan being evaluated, the control unit determines which storage region is assigned this delivery address. The control unit determines, furthermore, which issuing point lies directly upstream of this storage region and which branch-off point leads to this issuing point. For this purpose, the control unit preferably uses a computer-available description of the set-up of the sorting plant.

In the example of FIG. 1, the storage region S(1) is assigned to the delivery address of the preceding mail item Ps1. The control unit determines this storage region S(1) and subsequently the issuing point Ein1 and the branch-off point Ab1. The control unit therefore activates the branch-off point Ab1. The mail item Ps1 is conducted out of the feed transport path Z into the connecting path V1 at the branch-off point Ab1, because the branch-off point Ab1 has been activated. The connecting path V1 transports the mail item Ps1 to the selected issuing point Ein1. The lead-away transport path W transports the mail item Ps1 in the transport direction T as far as the stored mail item which is rearmost, in the direction of transport T, and which is located downstream of the issuing point Ein1 in the storage region S(1). As a rule, this rearmost mail item was the last to be brought into the storage region S(1). The additional mail item Ps1 remains temporarily in the storage region S(1) which is formed in the lead-away transport path W between the selected issuing point Ein1 and the following issuing point Ein2. It is not necessary to move a mail item in the storage transport path past intermediately stored mail items, which would be possible only with difficulty. In the exemplary embodiment, this would not be possible at all.

Figure 2:
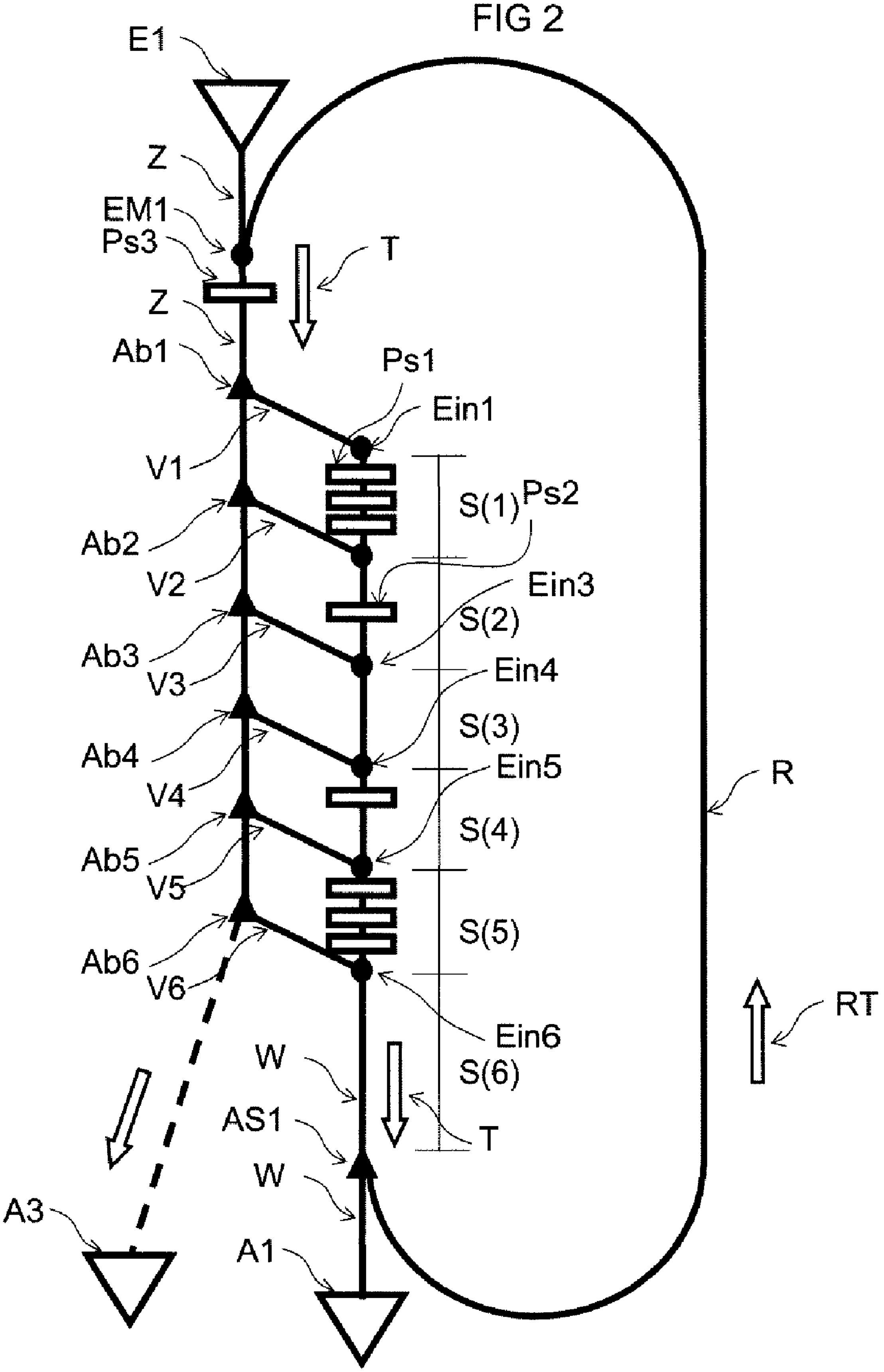
FIG. 2 shows the sorting plant of FIG. 1 with a further mail item in a storage region.

FIG. 2 shows the sorting plant of FIG. 1 after the mail item Ps1 has been transported as far as the storage region S(1). The mail item Ps1 has reached the selected storage region S(1) in FIG. 2 and is temporarily stored there as the currently last mail item.

In the example of FIG. 1, the storage region S(2) is assigned to the delivery address of the following mail item Ps2. The issuing point Ein2 leads to this storage region S(2) and the branch-off point Ab2 leads to said issuing point. The control unit therefore activates the branch-off point Ab2. The mail item is transported from the feed transport path Z past the branch-off point Ab1 as far as the branch-off point Ab2. The connecting transport path V2 transports the following mail item Ps2 to the selected issuing point Ein2 in the lead-away transport path W. The mail item Ps2 is stored in the storage region S(2). The following mail item Ps2 has thereby overtaken the preceding mail item Ps1. The overtaking transport path, here the feed transport path Z, was used for overtaking.

FIG. 2 shows the sorting plant of FIG. 1 after the mail item Ps2 has been transported as far as the storage region S(2). In FIG. 2, the mail item Ps2 has reached the storage region S(2) and is temporarily stored there as the hitherto sole mail item.

A third mail item Ps3 is then transported by the feed transport path Z toward the first branch-off point Ab1. The first storage region S(1) is likewise assigned to the delivery address of this third mail item Ps3. FIG. 2 shows the third mail item Ps3, which follows the mail item Ps2, upstream of the first branch-off point Ab1.

The filling-level sensor for the assigned first storage region S(1) has, however, detected and communicated that there is no space for a further mail item in the first storage region S(1). This communication triggers the following method steps which are preferably carried out with a time overlap:

The lead-away transport path W draws all the mail items which are intermediately stored in the storage regions S(1), S(2), . . . forward by the amount of one position in the sequence of the storage regions. The mail items intermediately stored previously in the storage region S(1) pass into the next storage region S(2). The mail item intermediately stored previously in the storage region S(2) passes into the next storage region S(3), and so on and so forth. The hitherto unused storage region S(6) is filled, as a result of drawing forward, with the mail items from the storage region S(5) lying upstream of it.

The control device amends the sorting plan in the data store. The storage region S(3) is then assigned to a delivery address to which the storage region S(2) has hitherto been assigned. The storage region S(4) is then assigned to a delivery address to which the storage region S(3) has hitherto been assigned. The storage region S(5) is then assigned to a delivery address to which the storage region S(4) has hitherto been assigned. The storage region S(6) is then assigned to a delivery address to which the storage region S(5) has hitherto been assigned. By contrast, the sorting plan continues to assign the storage region S(1) to a delivery address to which the storage region S(1) has hitherto been assigned.

The mail item Ps3 is transported as far as the first branch-off point Ab1 and from there, via the connecting path V1 and the first issuing point Ein1, into the lead-away transport path W and is intermediately stored in the first storage region S(1).

Figure 3:
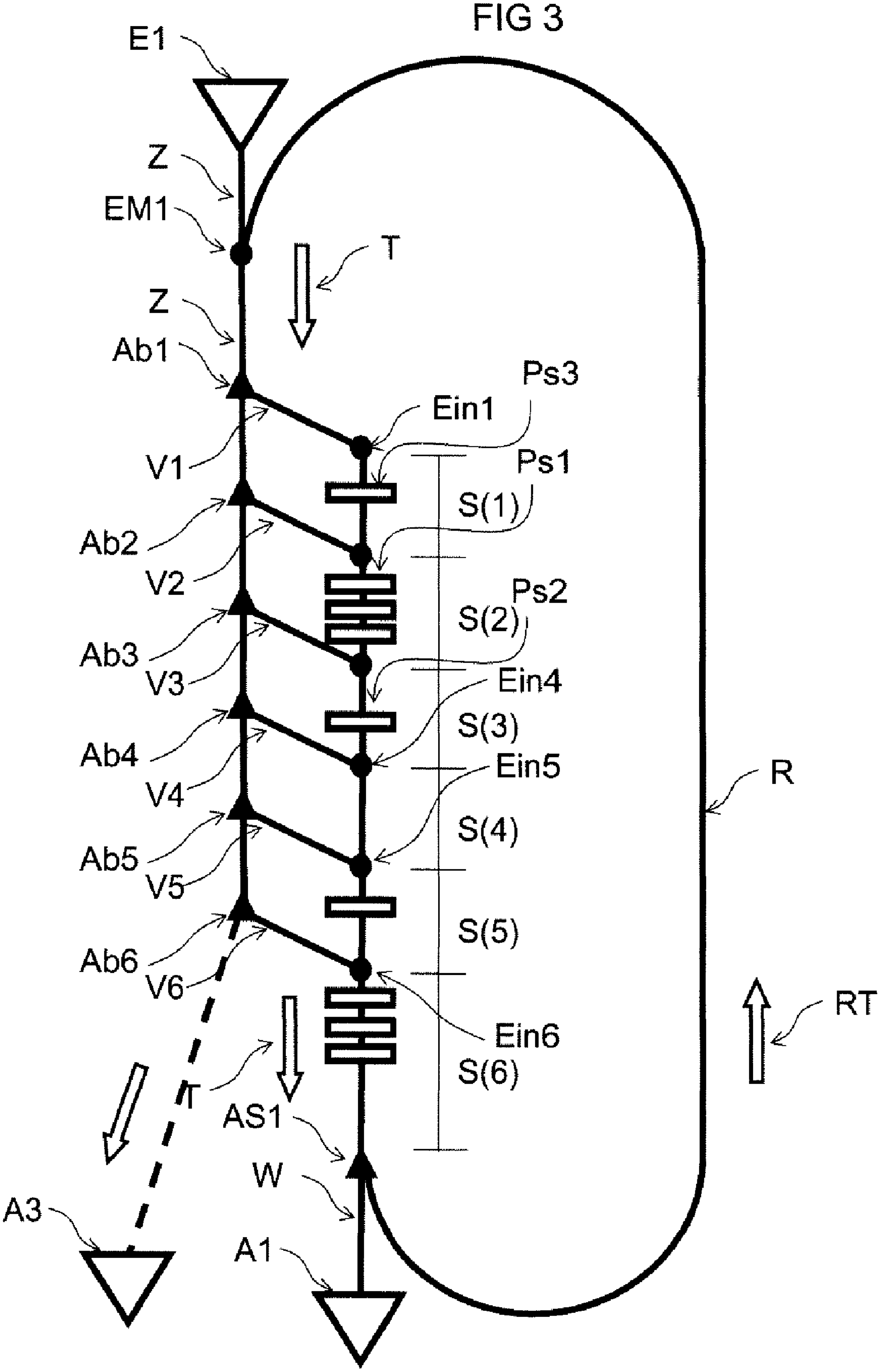
FIG. 3 shows the sorting plant of FIG. 1, after the intermediately stored mail items have been drawn forward by the amount of one position in the sequence of the storage regions.

FIG. 3 shows the situation after the mail items have been drawn forward and the mail item Ps3 has been brought into the then free storage region S(1).

The second storage region S(2) is filled, and further mail items are no longer intermediately stored in the second storage region S(2) during this sorting run.

In a general case, all those mail items are drawn forward by the amount of one position in the sequence of the storage regions which are intermediately stored in the filled storage region itself or in a storage region which is located between the filled storage region and the next downstream and still free reserve storage region.

The sorting plan is amended correspondingly.

In an alternative embodiment, each connecting transport path functions additionally as a further reserve storage region. If a storage region between two issuing points is filled, further mail items for these storage regions remain in that connecting transport path which leads to the upstream issuing point of these two issuing points. Only when the connecting transport path is also filled are the mail items drawn forward, as just described.

This refinement is especially space-saving. However, this refinement makes it necessary that the mail items stored in the connecting transport path are introduced between the other mail items during drawing forward, in order to maintain the stipulated order among the mail items.

In the example of FIG. 1, in this refinement the connecting transport path V1 would function as a further reserve storage region for the storage region S(1), the connecting transport path V2 as a further reserve storage region for the storage region S(2), and so on and so forth. This requires a longer return transport path.

After all the mail items to be sorted have been brought into one of the storage regions S(1), S(2), . . . , the mail items thus sorted are transported away. In the changed sorting plan, the storage region S(2) does not occur. This is because the storage region S(2) between the issuing points Ein2 and Ein3 is filled completely and currently can no longer receive any further mail items.

In the embodiment shown in FIG. 3, the original sorting plan does not assign a delivery address to the last issuing point Ein6, so that the last storage region S(6) remains free until it is filled up as a result of drawing forward. It is also possible to keep another storage region lying between two originally used storage regions free.

In one refinement, the mail items are sorted by means of a single sorting run. In this refinement, the lead-away transport path W transports the mail items as far as the discharge point A1.

In another refinement, a second sorting run is subsequently carried out for the same mail items. In this second sorting run, another sorting plan is used. In this refinement, the lead-away transport path W transports the mail items as far as the branch-off point AS1, without varying the order which was effected in the first sorting run. The return transport path R transports the mail items in a return transport direction RT from the branch-off point AS back to the issuing point EM1. The feed transport path Z subsequently transports the mail items to the branch-off points Ab1, Ab2, . . . , so that the following sorting run commences.

Figure 4:
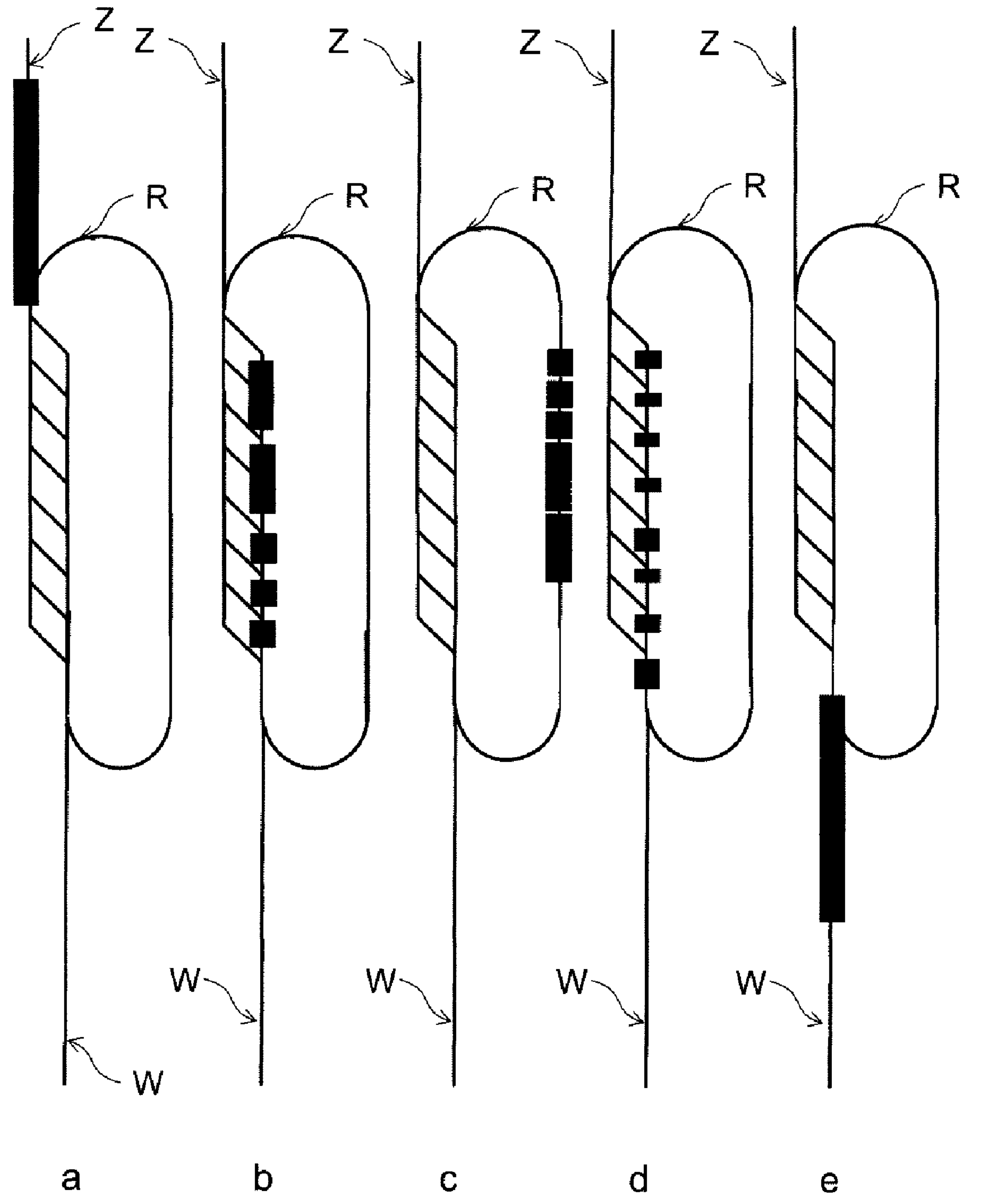
FIG. 4 shows a passage of mail items through the sorting plant of FIG. 1 in two sorting runs.

FIG. 4 illustrates a passage of mail items through the sorting plant of FIG. 1 in two sorting runs.

It can be seen in FIG. 4A how the feed transport path Z transports a stack of mail items toward the issuing point EM1 and the branch-off points Ab1, Ab2, . . . . The respective delivery addresses have already been read.

The feed transport path Z transports the mail items further on. The control unit suitably activates the eight branch-off points. The eight connecting transport paths V1, V2, . . . transport the mail items to the eight issuing points Ein1, Ein2, . . . . As a result, the mail items are distributed to the seven storage regions S(1), S(2), . . . between the eight issuing points Ein1, Ein2, . . . . The eighth storage region downstream of the last issuing point is not used in the first sorting run. FIG. 4 b shows the situation after the mail items are distributed.

A second sorting run follows. The lead-away transport path W therefore transports the sorted mail items as far as the branch-off point AS1. The return transport path R transports the sorted mail items back to the issuing point EM1. FIG. 4 *c* shows the situation in which the return transport path R transports the sorted mail items.

Figure 5:
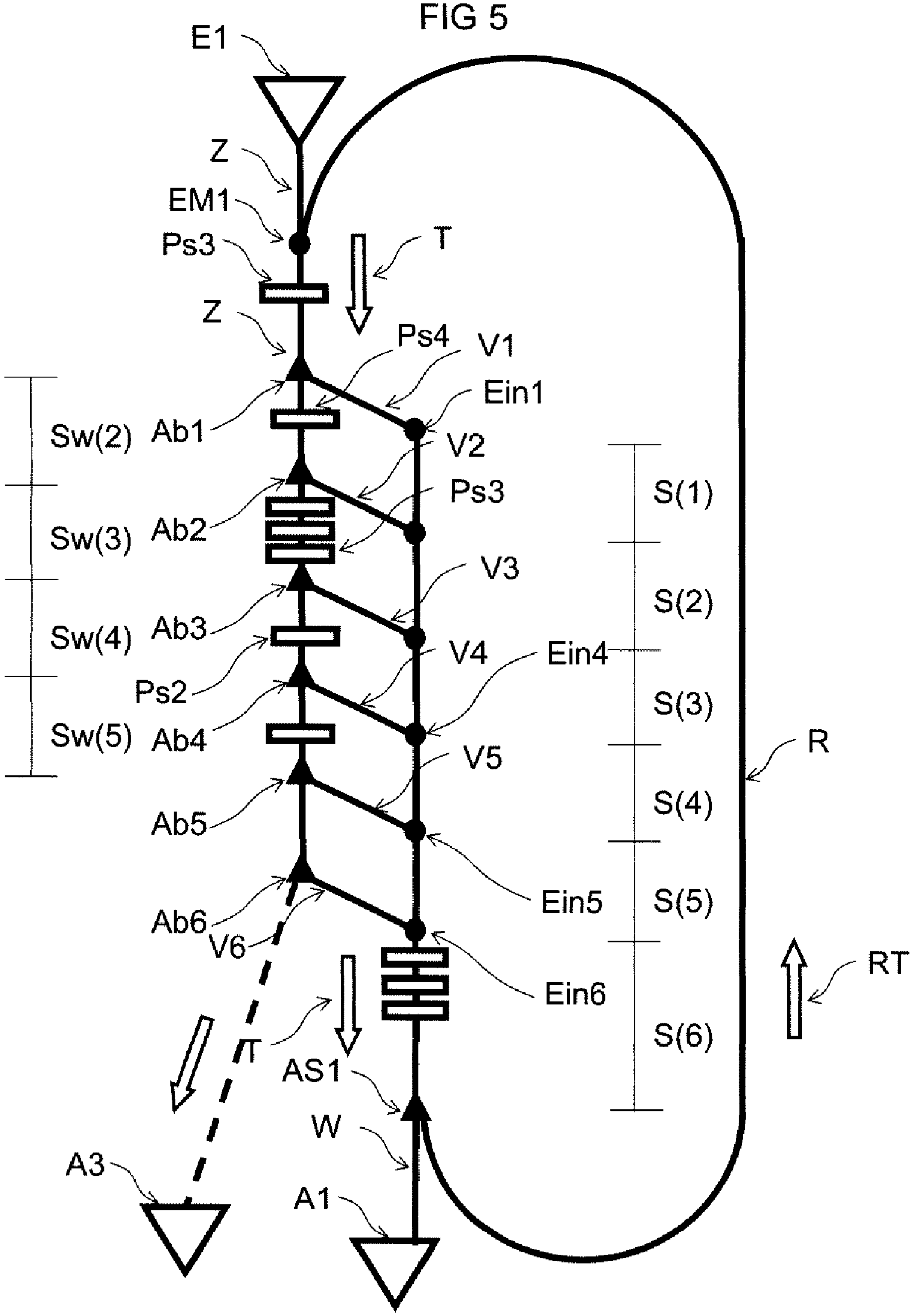
FIG. 5 shows the sorting plant of FIG. 1 with further storage regions in the feed transport path.

FIG. 5 shows the sorting plant of FIG. 1 with additional storage regions in the feed transport path. Four further storage regions Sw(2), Sw(3), Sw(4), Sw(5) are arranged in the feed transport path. The further storage region Sw(2) lies between the branch-off points Ab1 and Ab2, the storage region Sw(3) lies between the branch-off points Ab2 and Ab3, and so on and so forth. The mail item Ps4 is located in the further storage region Sw(2), three mail items are located in the further storage region Sw(3), and the mail item Ps2 is located in the further storage region Sw(4). The further storage region Sw(2) extends the storage region S(2), the further storage region Sw(3) extends the storage region S(3), and so on and so forth. The sorting plan assigns to the delivery address of the mail item Ps4 the storage region S(2) which is extended by the further storage region Sw(2). The sorting plan assigns to the delivery address of the mail item Ps2 the storage region S(4) which is extended by the further storage region Sw(4).

In the example of FIG. 5, the feed transport path Z then transports a further mail item Ps3 to the first branch-off point Ab1.

If the storage region S(6) is assigned to the delivery address of this mail item, the mail item Ps3 is transported via the branch-off point Ab1 and the issuing point Ein1 as far as the storage region S(6) which lies furthest downstream.

Figure 6:
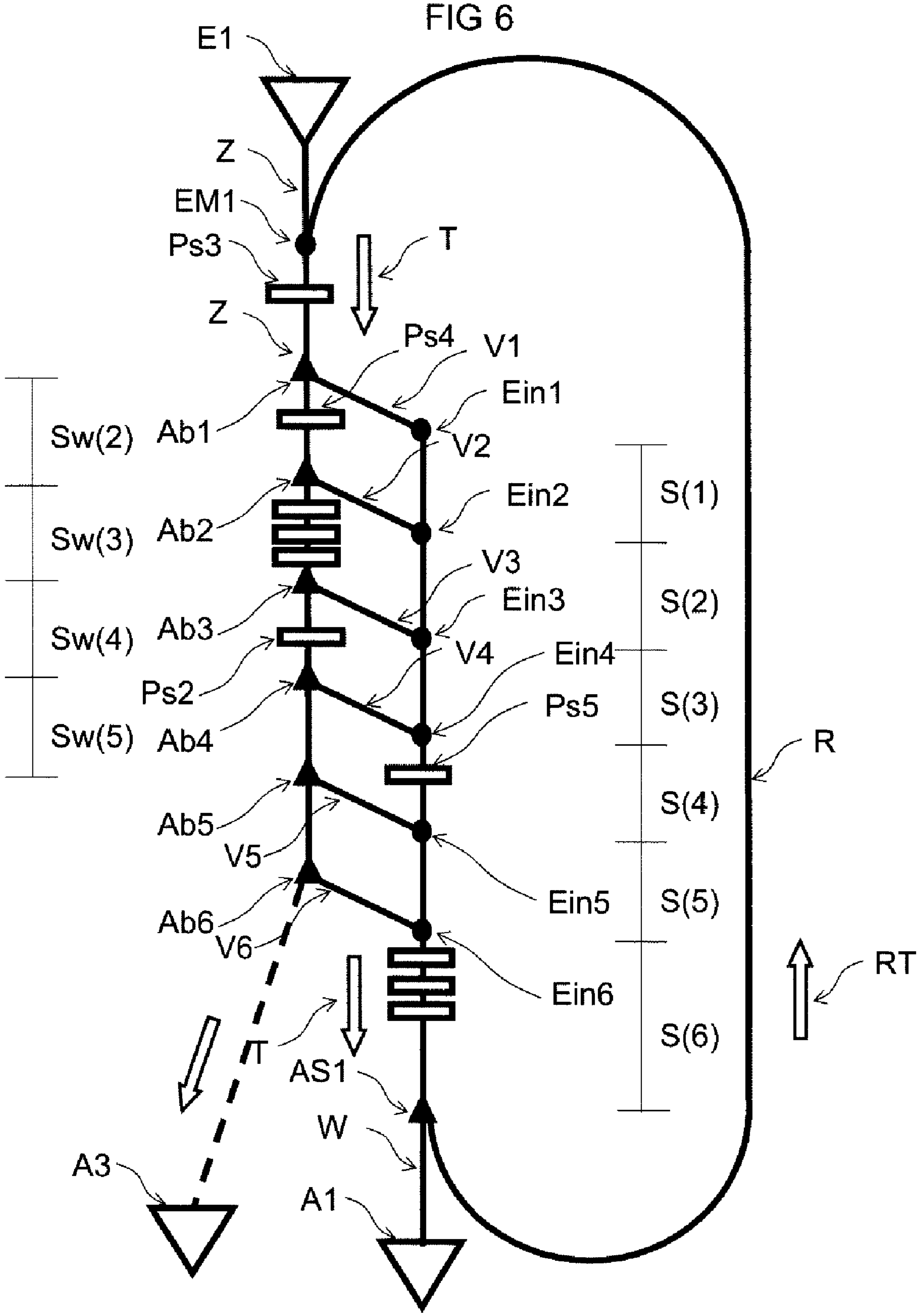
FIG. 6 shows the sorting plant of FIG. 5 with mail items in the further storage regions and with a mail item in a storage region.

If this mail item Ps3 is assigned another storage region in the lead-away transport path W, for example the storage region S(5), further storage regions in the feed transport path are emptied, as required. FIG. 6 shows the situation where the mail item Ps5 is stored in the storage region S(4). So that the mail item Ps3 can be transported as far as the assigned storage region S(5), the further storage regions Sw(2), Sw(3), Sw(4) and Sw(5) are emptied. The mail items in the further storage region Sw(2) are transported via the branch-off point Ab2 and the issuing point Ein2 as far as the storage region S(2). As a result, the feed transport path Z is free, and the feed transport path Z transports the mail item Ps3 as far as the branch-off point Ab5.

In the example of FIG. 5 and FIG. 6, the lead-away transport path W is designed as the storage transport path, and additional storage regions are present in the feed transport path. It is also possible to use the feed transport path Z as a storage transport path and the lead-away transport path W as the overtaking transport path. In this case, each connecting transport path V1, V2, . . . is designed so that it can transport mail items in both directions, that is to say not only from a branch-off point Ab1, Ab2, . . . to the associated issuing point Ein1, Ein2, . . . , but also, in reverse, from an issuing point back to the associated branch-off point.

Figure 7:
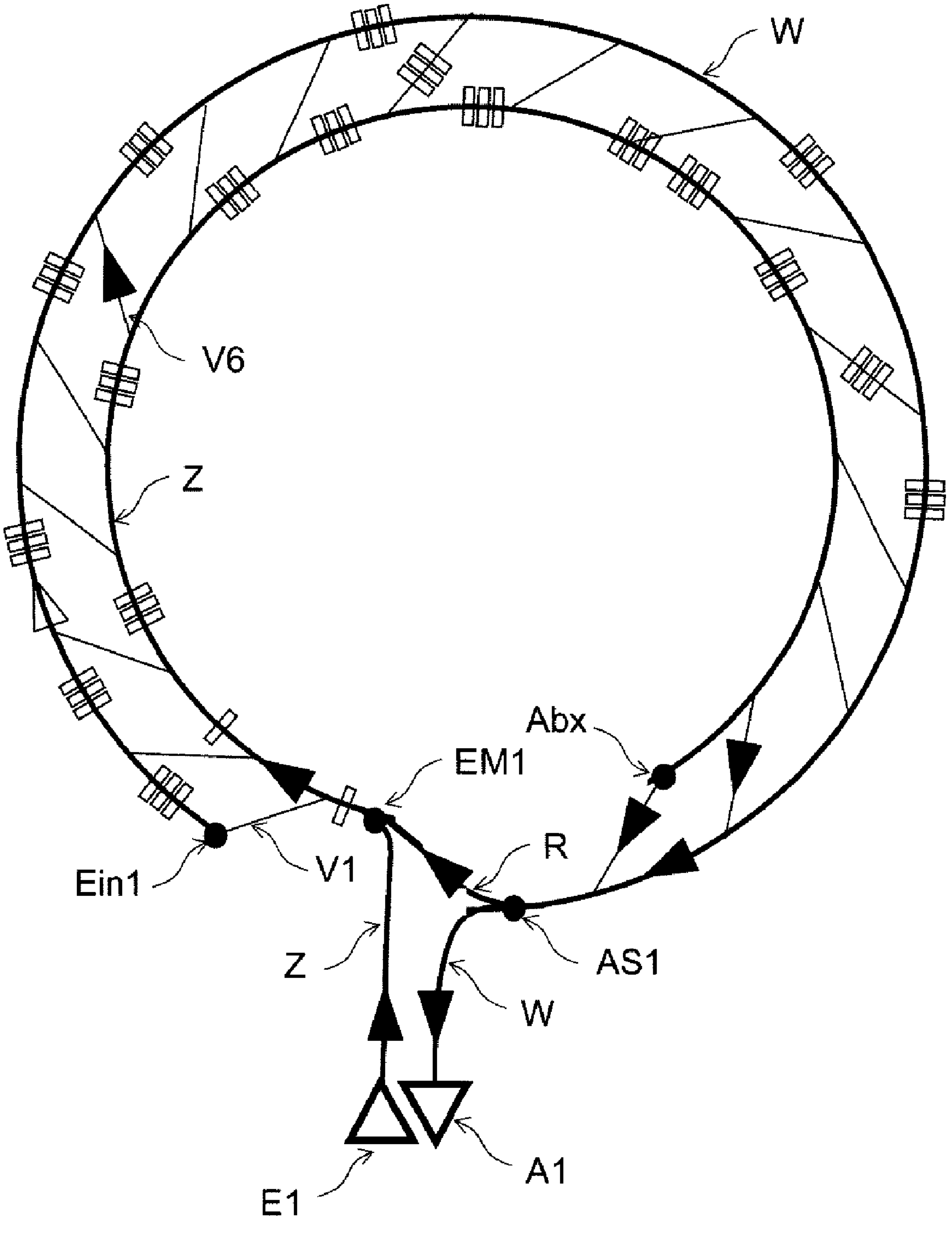
FIG. 7 shows a modification of the sorting plant of FIG. 1 with circular transport paths and with a short return transport path.

FIG. 7 shows an especially advantageous refinement of the sorting plant of FIG. 1. Identical reference symbols designate the same components as in FIG. 1. The sorting plant of FIG. 7 possesses a closed transport path which consists of the following components:

that portion of the feed transport path Z which lies downstream of the issuing point EM1 and which reaches as far as the last branch-off point Abx, the return transport path R, and that portion of the lead-away transport path Z which lies in the first issuing point Ein1 and which reaches as far as the branch-off point AS1.

The storage regions occupy more than half of this closed transport path. The rest of the transport path which comprises the return transport path preferably occupies only a fraction of the entire distance, for example less than one tenth or even less than one hundredth. Each storage region lies in each case in a segment of this closed transport path. The closed transport path contains curved segments. Preferably, at least some storage regions lie in each case in a curved segment.

The closed transport path may also utilize the third dimension, that is to say be distributed to a plurality of planes lying one above the other. This refinement requires especially small floor area ("footprint").

Both the feed transport path Z and the lead-away transport path W are of circular design in the sorting plant of FIG. 7. A large number of storage regions are thereby formed in the lead-away transport path W. In the sorting plant of FIG. 7, the return transport path R is very short, as compared with the feed transport path Z and with the lead-away transport path W, so that mail items can be transported quickly along this return transport path R. It is also possible for the feed transport path Z and/or the lead-away transport path W to be of meander-shaped design, preferably as a sequence of curved segments with as small a curved radius as possible and of straight segments. This refinement utilizes the existing floor area effectively.

The sorting plant of FIG. 7 can advantageously be used for sorting in at least two successive sorting runs. As soon as a storage region is filled in the first sorting run and then emptied again, the storage region is available for the next sorting run. This makes it possible to carry out the two sorting runs with a time overlap.

Figure 8:
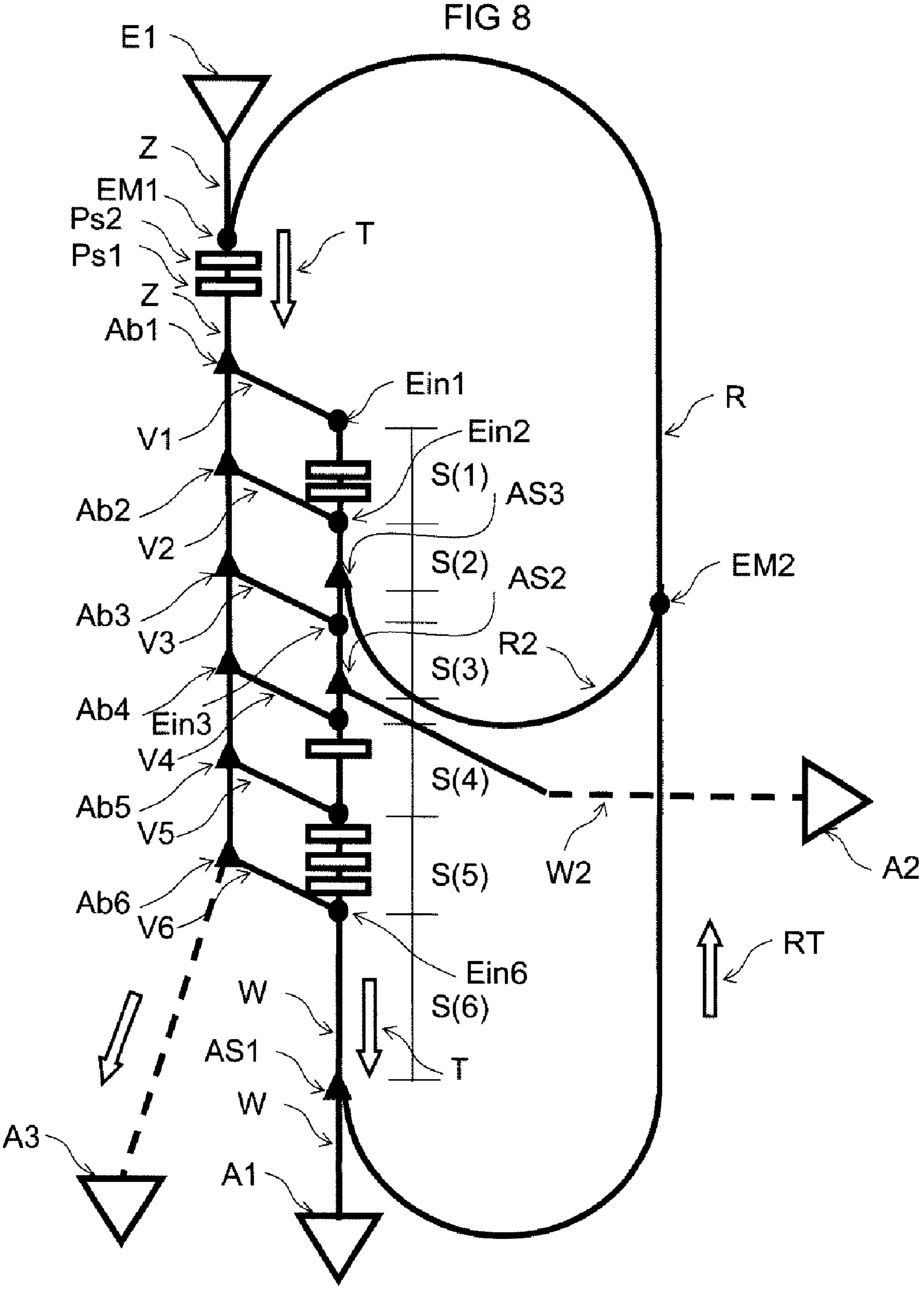
FIG. 8 shows a modification of the sorting plant of FIG. 1 with a further return transport path and with a further lead-away transport path.

FIG. 8 shows a sorting plant which, as compared with the sorting plant of FIG. 1, has the following additional components:

a further return transport path R2 which branches off from the lead-away transport path W at a return branch-off point AS3 and which issues into the return transport path R at a further issuing point EM2, and a further lead-away transport path W2 which leads at a lead-away branch-off point AS2 to a further discharge point A2.

In a general case, the sorting plant of FIG. 8 possesses N1 issuing points which, as seen in the transport direction, lie upstream of the lead-away branch-off point AS2 to the further lead-away transport path W2, and N2 issuing points which lie downstream of the lead-away branch-off point AS2. As a result, N1−1 storage regions upstream and N2+1 storage regions downstream of the lead-away branch-off point AS2 are formed. In the example of FIG. 8, N1=4 and N2=2.

The sorting plant of FIG. 8 is used, for example, for a sorting task which arises as a result of the following requirement: incoming mail items are to be transported either to a delivery address in the region of this sorting plant ("local delivery") or to another sorting plant ("further transport"). The mail items to be delivered locally to a delivery address in the region of this sorting plant are to be sorted exactly according to a delivery round sequence. The mail items to be transported further to other sorting plants are to be sorted according to a stipulated order among these other sorting plants. A more exact sorting will be carried out only later, specifically by the other sorting plant competent in each case. For every other sorting plant, in each case a stack of mail items is to be produced, which is subsequently transported to this other sorting plant.

The sorting plant of FIG. 8 carries out two sorting runs. In the first sorting run, the mail items to be transported further are distributed to the first N1−1 storage regions. In the first sorting run, therefore, a maximum of N1−1 stacks of mail items for other sorting plants can be produced. In the first sorting run, the mail items to be delivered locally are distributed to the other N2+1 storage regions.

In the example of FIG. 8, in the first sorting run, the mail items to be transported further are distributed to the storage regions S(1), S(2) and S(3). The mail items to be delivered locally are distributed to the other storage regions S(4), S(5) and S(6).

At the latest after the end of the first sorting run, the mail items to be transported further are transported in the first N1−1 storage regions in the lead-away transport path as far as the lead-away branch-off point AS2 and from there via the further lead-away transport path W2 to the further discharge point A2. In one refinement, individual stacks are formed. The individual stacks may be separated in that in each case a separating element is inserted between two adjacent stacks, or in that different stacks are brought into different containers. If holding components are used, each mail item preferably remains in the same holding component during the entire sorting.

The transporting away of the mail items in the first N1−1 storage regions S(1), S(2), . . . is even commenced, upstream of the lead-away branch-off point AS2, as soon as the last mail item to be transported further has reached the assigned storage region and a further mail item of this type no longer follows, even if mail items to be delivered locally still follow.

It is possible that, during the first sorting run, at least one of the first N1−1 storage regions for mail items to be transported further is filled completely and a further mail item is to be transported into this full storage region as a reserve storage region. Preferably, therefore, at least one of the first N1−1 storage regions is configured as a reserve storage region to which the original sorting plan does not assign a delivery address. In the example of FIG. 8, for example, the storage region S(3) is provided as a reserve storage region, more generally at least that of the N1−1 storage regions which is last in the transport direction T. When one of the N1−1 storage regions is filled, the mail items are drawn forward as far as the reserve storage region, in order to provide space for the further mail item.

If this is no longer possible because a free reserve storage region is no longer available among the first N1−1 storage regions, preferably all N1−1 storage regions are emptied upstream of the lead-away branch-off point AS2, in that the mail items are transported via the further lead-away transport path W2 to the further discharge point A2. The rest of the sorting process is not held up by this drawing forward. The sorting plan is not changed.

The mail items to be delivered locally in the N2+1 storage regions downstream of the lead-away branch-off point AS2 are to be sorted exactly according to delivery round sequences. For this purpose, at least one further sorting run is carried out. The mail items in the N2+1 storage regions are transported to the feed transport path Z again via the return transport path R. During the return a feed order among the storage regions is maintained. This feed order results from the sequence of N=N1+N2 storage regions in the lead-away transport path. The mail items from the storage region S(N) located furthest downstream are fed first, then those from the preceding storage region S(N−1), and so on and so forth as far as S(N2).

Since the first N1−1 storage regions were emptied before the second sorting run, all N1+N2 storage regions are available in the second sorting run. In the first sorting run, N1−1 storage regions are available. The sorting plant can therefore sort the mail items to be delivered, by means of the two sorting runs, to a maximum total of (N1−1)*(N1+N2) delivery addresses.

It is possible to add a third sorting run for the same mail items. The sorting plant can then sort to a maximum total of (N1−1)*(N1+N2)*(N1+N2) delivery addresses.

The sorting plant of FIG. 8 can also be used for straightforward delivery round sequence sorting. In both sorting runs, the N=N1+N2 storage regions are used. At the return branch-off point AS3, the further return transport path W2 branches off from the lead-away transport path W. The return branch-off point AS3 subdivides the sequence of the N issuing points in the lead-away transport path into M1 issuing points upstream of (above) the return branch-off point AS3 and M2 issuing points downstream of (below) the return branch-off point AS3. Preferably, the M1−1 storage regions lying upstream of AS3 are emptied, in that the mail items are transported out of these M1−1 storage regions from the further return transport path R2 as far as the further issuing point EM2 and subsequently from the return transport path R to the feed transport path Z. The remaining M2+1 storage regions, that is to say those lying downstream of AS3, are emptied solely via the return transport path R, and the return transport path R leads these mail items to the feed transport path Z.

Since a shorter distance (from AS3 via R2 to EM2 and then via R to EM1) and a longer distance (from AS1 via R to EM1) are available, the M1−1 storage regions upstream of AS3 and the M2+1 storage regions downstream of AS3 can be emptied with a time overlap. The mail items from the M1−1 storage regions upstream of AS3 reach the issuing point EM1 after a shorter transport time than the mail items from the M2+1 storage regions downstream of AS3.

The sorting plant of FIG. 8 can also be used for the following sorting task: the delivery addresses or other feature values according to which sorting is to be carried out are subdivided into two groups of feature values, to be precise into a first group with few mail items per feature value and a second group with many mail items per feature value. In a first sorting run, the first M1−1 storage regions are used in order to sort the mail items of the first group. The following M2+1 storage regions are used in order to sort the mail items of the second group.

A mail item of the first group is transported, in the first sorting run, into one of the M1−1 storage regions upstream of the return branch-off point AS3, and a mail item of the second group is transported into one of the M2+1 storage regions downstream of AS3. After the first sorting run, the M2+1 storage regions downstream of AS3 are emptied in that the mail items are transported via the lead-away transport path W to the discharge point A1. If AS2 lies downstream of AS3, as is the case in the example of FIG. 8, the M2+1 storage regions can also be emptied in that the mail items are transported via the further lead-away transport path W2 to the further discharge point A2.

The mail items of the first group are sorted by means of a subsequent second sorting run. For this purpose, the mail items are transported out of the M1−1 storage regions upstream of the return branch-off point AS3, via the further return transport path R2, to the issuing point EM2 and, via the return transport path R, to the feed transport path Z. The two operations of emptying the M2+1 storage regions and of emptying the M1−1 storage regions are preferably carried out with a time overlap, specifically in such a way that the M2+1 storage regions downstream of AS3 are emptied at the latest when the first mail item of the first group reaches EM1 again.

All M1+M2 storage regions are available for the second sorting run. This refinement makes it possible to sort to a maximum of m2+1 different feature values of the second group and to (M1−1)*(M1+M2) different feature values of the first group.

Figure 9:
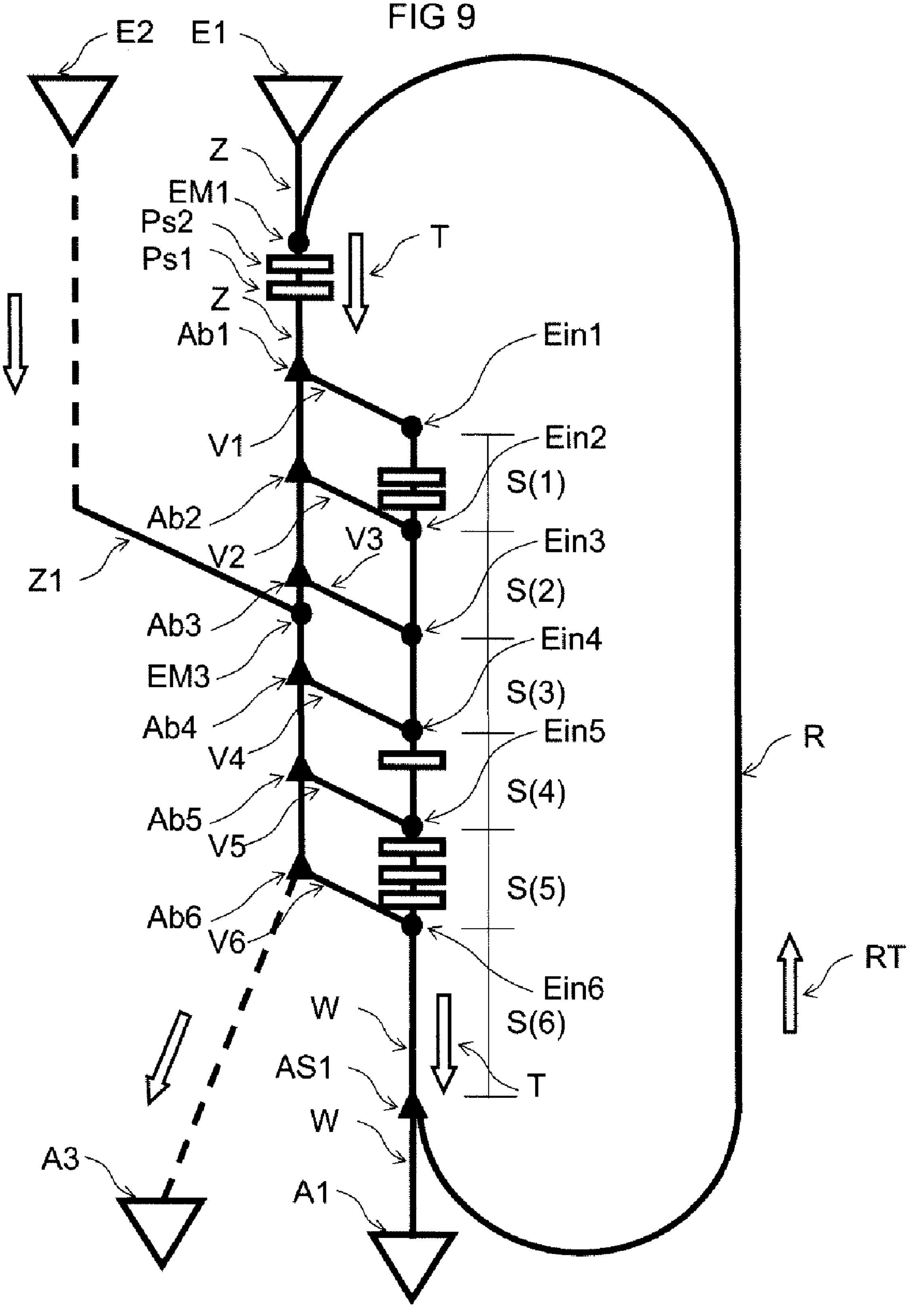
FIG. 9 shows a modification of the sorting plant of FIG. 1 with an additional feed transport path.

FIG. 9 shows a modification of the sorting plant of FIG. 1 with an additional infeed point E2 and with an additional feed transport path Z1. This additional feed transport path Z1 leads from the additional infeed point E2 to an issuing point E3 in the feed transport path. The issuing point E3 subdivides the sequence of branch-off points Ab1, Ab2, . . . in the feed transport path Z into P1 branch-off points upstream of EM3 and P2 branch-off points downstream of EM3. In the example of FIG. 9, P1=P2=3.

In one refinement, a first stack of mail items is presorted by another sorting plant. This stack of presorted mail items is fed via the additional infeed point E2 into the sorting operation which the sorting plant of FIG. 9 carries out. The additional feed transport path Z1 transports this first stack to the issuing point E3 where the first stack is transported further in the feed transport path Z. In order to sort the mail item of the first stack, P2+1 storage regions in the lead-away transport path are available in the sorting run then carried out.

A second stack of unsorted mail items is fed to the sorting operation by means of the infeed point E1 exactly as indicated in FIG. 1. In order to sort the mail items of the second stack, all P1+P2 storage regions are available.

The invention claimed is:

1. A sorting plant for the sorting of a plurality of articles, the sorting plant comprising:

a feed transport path;

a lead-away transport path;

a plurality of connecting transport paths each branching off from said feed transport path and issuing into said lead-away transport path;

a plurality of storage regions, each configured for temporarily storing a plurality of articles to be sorted; and a data storage device with a computer-evaluatable sorting plan;

said feed transport path, each said connecting transport path, and said lead-away transport path being configured for transporting the articles in a given transport direction;

said sorting plan assigning a storage region, in each case to each possible feature value of a stipulated sorting feature;

a measuring device configured for measuring, for each article to be sorted, which feature value the sorting feature assumes for the respective article;

wherein one of said feed transport path or said lead-away transport path is configured as a storage transport path and the other of said feed transport path and lead-away transport path is configured as an overtaking transport path;

wherein said storage transport path comprises said storage regions, in the form of a sequence of successive storage regions, and wherein the sorting plant is configured:

for each article to be sorted, to use the sorting plan and, as a function of the measured feature value, to select a storage region;

to transport each article at least once on said feed transport path, on a respective said connecting transport path, and on said lead-away transport path, and to temporarily store the article in the selected said storage region;

when the sorting plant has selected a first storage region for a first article and a second storage region for a following, second article, wherein the second storage region, as seen in the transport direction of the storage transport path, comes after the first storage region in the sequence:

to temporarily store the first article in the first storage region;

to transport the second article, using the overtaking transport path, past the first article stored in the first storage region to the second storage region;

so that, after transport, the articles are sorted as a function of the respective feature values thereof in said lead-away transport path.

2. The sorting plant according to claim 1, wherein said storage transport path comprises at least one reserve storage region to which the sorting plan does not assign a feature value, and the sorting plant is configured:

after the selection of a storage region which, as seen in the transport direction of the storage transport path, is arranged upstream of the reserve storage region;

to transport those articles that are stored in the storage transport path between the selected storage region and the reserve storage region;

in the storage transport path in such a way that those articles move forward by the amount of one storage region in the sequence; and to automatically amend the sorting plan so that the changed sorting plan assigns to each feature value, to which the original sorting plan assigns a storage region lying upstream of the reserve storage region in the sequence;

in each case that storage region which follows downstream of the previously assigned storage region by the amount of one position in the sequence.

3. The sorting plant according to claim 2, wherein the reserve storage region is arranged, in the sequence of the storage regions, between two storage regions to which the sorting plan in each case assigns at least one possible feature value.

4. The sorting plant according to claim 1, which further comprises at least one return transport path, said return transport path branching off from said lead-away transport path and issuing into said feed transport path and being configured to transport articles from said lead-away transport path into said feed transport path.

5. The sorting plant according to claim 4, wherein:

a portion of said feed transport path, said return transport path and a portion of said lead-away transport path forming a closed transport path;

said closed transport path comprising the entire sequence of storage regions, or part of the sequence of storage regions; and the sequence of storage regions, occupies more than half of said closed transport path.

6. The sorting plant according to claim 5, wherein said closed transport path comprises at least one curved segment, and each storage region is arranged in each case in a curved segment of the transport path.

7. The sorting plant according to claim 4, wherein:

each connecting transport path issues into said lead-away transport path at a respective issuing point;

and said lead-away transport path comprises a sequence of issuing points; and said return transport path branches off from said lead-away transport path between two issuing points; and issues into said feed transport path upstream of a first said branch-off point at which a connecting transport path branches off from said feed transport path.

8. The sorting plant according to claim 1, which comprises a further lead-away transport path, said further lead-away transport path branching off from said lead-away transport path between two issuing points, and said further lead-away transport path is configured to discharge articles out of said lead-away transport path before these articles reach that issuing point of these two issuing points which is at a rear, as seen in the transport direction of the lead-away transport path.

9. The sorting plant according to claim 1, wherein:

each said connecting transport path issues into said lead-away transport path at a respective issuing point, with said lead-away transport path having a sequence of said issuing points;

the lead-away transport path is configured as said storage transport path; and in each case an issuing point lies upstream of each storage region, as seen in the transport direction of said lead-away transport path.

10. The sorting plant according to claim 1, wherein:

each connecting transport path branches off from said feed transport path at a respective branch-off point, with said feed transport path having a sequence of branch-off points;

said feed transport path is configured as a storage transport path; and in each case a branch-off point lies upstream of each storage region, as seen in the transport direction of said feed transport path.

11. The sorting plant according to claim 1, configured to operate in and change over at least once between:

a first mode, in which said lead-away transport path is configured as said storage transport path and said feed transport path is configured as the overtaking transport path; and a second mode, in which said feed transport path is configured as said storage transport path and said lead-away transport path is configured as the overtaking transport path.

12. The sorting plant according to claim 1, which comprises a plurality of holding components each configured for holding an article to be sorted, and wherein the sorting plant is configured:

to connect each article temporarily to a respective holding component and to transport the article, held by said holding component, on said feed transport path, on a connecting transport path, and on said lead-away transport path; and to temporarily store the article held by said holding component in the selected storage region.

13. The sorting plant according to claim 1, wherein said lead-away transport path is configured as the storage transport path, and the sorting plant is configured:

for transporting each article to be sorted on said feed transport path and on a connecting transport path which leads to the selected said storage region; and for using said connecting transport path used for transport as a reserve storage region for the selected said storage region.

14. The sorting plant according to claim 1, wherein:

a further computer-evaluatable sorting plan is stored in the data storage device, the further sorting plan likewise assigning in each case a storage region, to each possible feature value of the sorting feature; and the sorting plant is configured, for each article to be sorted, for selecting a storage region, using the further sorting plan and as a function of the measured feature value, and for transporting each article from said lead-away transport path to said feed transport path and for subsequently transporting the article once again on said feed transport path, on a connecting transport path and on said lead-away transport path and for temporarily storing the article in the storage region, selected according to the further sorting plan.

15. The sorting plant according to claim 1, which further comprises:

a first infeed device and a second infeed device each configured for feeding in articles to be sorted, wherein each article fed in by a respective said infeed device is forwarded to said feed transport path;

an additional feed transport path leading from said second infeed device to said feed transport path and issuing into said feed transport path at an issuing point, wherein:

said issuing point lies between two branch-off points in said feed transport path; and in each case a connecting transport path branches off from said feed transport path at said two branch-off points.

16. A method of sorting a plurality of articles, which comprises the following method steps:

providing a sorting plant and a computer-evaluatable sorting plan, the sorting plant having:

a feed transport path;

a lead-away transport path;

a plurality of connecting transport paths; and a plurality of storage regions;

each connecting transport path branching off from the feed transport path and issuing into the lead-away transport path;

the sorting plan assigning in each case a storage region, to each possible feature value of a stipulated sorting feature, and for each article to be sorted:

measuring which feature value the sorting feature assumes for the respective article; and automatically selecting a storage region, using the sorting plan and as a function of the measured feature value, transporting each article to be sorted on the feed transport path, on a connecting transport path and on the lead-away transport path and temporarily storing each article to be sorted in the selected storage region;

resulting in the articles to be sorted as a function of their feature values in the lead-away transport path;

thereby using the feed transport path or the lead-away transport path as a storage transport path, and using the other of the feed transport path and the lead-away transport path as an overtaking transport path;

wherein the storage transport path contains the storage regions, in the form of a sequence of successive storage regions;

storing a plurality of articles simultaneously in at least one storage region; and when a first storage region has been selected for a first article and a second storage region, which comes after the first storage region in the sequence, has been selected for a following second article:

temporarily storing the first article in the first storage region; and transporting the second article, using the overtaking transport path, past the first article stored in the first storage region to the second storage region.

17. The method according to claim 16, wherein the storage transport path of the sorting plant comprises at least one reserve storage region, and the method further comprises:

after a storage region which is arranged upstream of a reserve storage region, as seen in the transport direction of the lead-away transport path, has been selected;

transporting those articles, which are stored in the storage transport path between the selected storage region and this reserve storage region of the storage transport path, in the storage transport path in such a way that these articles move forward by the amount of one storage region in the sequence; and automatically amending the sorting plan so that:

the amended sorting plan assigns to each feature value, to which the original sorting plan assigns a storage region lying upstream of the reserve storage region in the sequence;

in each case that storage region which follows downstream of the previously assigned storage region by the amount of one position in the sequence.

18. The method according to claim 16, wherein each connecting transport path of the sorting plant issues into the lead-away transport path in each case at an issuing point, with the lead-away transport path having a sequence of issuing points, and the sorting plant additionally comprises a return transport path, with the return transport path branching off from the lead-away transport path at a return branch-off point, the return branch-off point lying between two issuing points of the sequence, and issuing into the feed transport path, and the method further comprises:

for those articles that are intermediately stored in those storage regions which lie upstream of the return branch-off point, as seen in the transport direction of the lead-away transport path:

transported those articles to the feed transport path via the return transport path; and transporting those articles once again on the feed transport path, on a connecting transport path and on the lead-away transport path, and temporarily storing in the selected storage region.

19. The method according to claim 18, which comprises transporting those articles that are intermediately stored downstream of the return branch-off point to a discharge point.

20. The method according to claim 18, which comprises providing a further computer-evaluatable sorting plan, the further sorting plan likewise assigning a storage region, in each case to each possible feature value of the sorting feature, and the method further comprising:

selecting for each article to be sorted a storage region, once again automatically, using the further sorting plan and as a function of the measured feature value;

each article to be sorted:

after being stored in a storage region, transporting from the lead-away transport path to the feed transport path;

transporting once again on the feed transport path, a connecting transport path, and on the lead-away transport path, and temporarily storing in the storage region, selected by way of the further sorting plan;

to thereby effect a renewed sorting of the articles in the lead-away transport path as a function of their feature values.

21. The method according to claim 16, wherein:

each connecting transport path of the sorting plant issues into the lead-away transport path in each case at an issuing point, and the lead-away transport path thus contains a sequence of issuing points; and the sorting plant additionally comprises a discharge point and a further lead-away transport path branching off from the lead-away transport path at a lead-away branch-off point, the lead-away branch-off point lying between two issuing points of the sequence and leading to the discharge point; and the method further comprises:

transporting those articles which are intermediately stored in those storage regions which lie upstream of the lead-away branch-off point, as seen in the transport direction of the lead-away transport path, to the discharge point via the further lead-away transport path; and transporting those articles which are intermediately stored in those storage regions which lie downstream of the lead-away branch-off point back to the feed transport path via a return transport path.

* * * * *

UNITED STATES PATENT AND TRADEMARK OFFICE

CERTIFICATE OF CORRECTION

PATENT NO. : 8,374,720 B2
APPLICATION NO. : 12/823501
DATED : February 12, 2013
INVENTOR(S) : Ottmar Kechel It is certified that error appears in the above-identified patent and that said Letters Patent is hereby corrected as shown below:

In the Claims:

Column 25,

Line 25, "20. The method according to claim 18," should read --20. The method according to claim 16,--

Column 26,

Line 26, "21. The method according to claim 16," should read --21. The method according to claim 18,--

Signed and Sealed this
Seventeenth Day of December, 2013

Margaret A. Focarino

*Commissioner for Patents of the United States Patent and Trademark Office*